United States Patent
Yamamoto (10) Patent No.: US 9,663,079 B2
(45) Date of Patent: May 30, 2017

(54) SYSTEMS FOR CONTROLLING TRAILER BRAKE OUTPUT CIRCUITS AND SYSTEMS FOR MONITORING MANUAL TRAILER BRAKE ACTIVATION SLIDER CIRCUITS

(71) Applicant: Toyota Motor Engineering & Manufacturing North America, Inc., Erlanger, KY (US)

(72) Inventor: Hidehiro Yamamoto, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 197 days.

(21) Appl. No.: 14/592,240

(22) Filed: Jan. 8, 2015

(65) Prior Publication Data
US 2016/0152217 A1    Jun. 2, 2016

Related U.S. Application Data

(60) Provisional application No. 62/086,399, filed on Dec. 2, 2014.

(51) Int. Cl.
*B60T 7/20* (2006.01)
*B60T 8/17* (2006.01)
*B60T 7/08* (2006.01)

(52) U.S. Cl.
CPC ............ *B60T 8/1708* (2013.01); *B60T 7/085* (2013.01); *B60T 7/20* (2013.01)

(58) Field of Classification Search
None
See application file for complete search history.

(56) References Cited

U.S. PATENT DOCUMENTS

| | | | | |
|---|---|---|---|---|
| 4,856,850 A | * | 8/1989 | Aichele | B60T 13/662 188/156 |
| 5,149,176 A | * | 9/1992 | Eccleston | B60T 7/20 188/1.11 E |
| 5,242,215 A | * | 9/1993 | Krause | B60T 13/683 303/15 |
| 5,615,930 A | * | 4/1997 | McGrath | B60T 7/20 303/124 |
| 5,905,433 A | * | 5/1999 | Wortham | G07C 5/008 307/9.1 |

(Continued)

*Primary Examiner* — Jonathan M Dager
(74) *Attorney, Agent, or Firm* — Dinsmore & Shohl LLP (57) ABSTRACT

Systems for controlling trailer brake output circuits and systems for monitoring manual trailer brake activation slider circuits are provided. A system for controlling a trailer brake output circuit includes a trailer brake output circuit and a manual trailer brake activation slider circuit. The manual trailer brake activation slider circuit includes at least one potentiometer that outputs a potentiometer output signal having a voltage that ranges between a minimum output voltage and a maximum output voltage. The system compares the voltage of the potentiometer output signal to a threshold voltage that is greater than the minimum output voltage of the potentiometer output signal and less than the maximum output voltage of the potentiometer output signal, and controls the trailer brake output circuit based on the comparison of the voltage of the potentiometer output signal to the threshold voltage.

19 Claims, 4 Drawing Sheets

(56) References Cited

U.S. PATENT DOCUMENTS

| | | | |
|---|---|---|---|
| 6,012,780 A * | 1/2000 | Duvernay | B60T 7/20 188/112 R |
| 6,039,410 A * | 3/2000 | Robertson | B60T 7/20 188/3 R |
| 6,068,352 A * | 5/2000 | Kulkarni | B60T 13/74 303/124 |
| 6,179,390 B1 * | 1/2001 | Guzorek | B60T 7/042 188/3 R |
| 6,282,480 B1 * | 8/2001 | Morse | B60T 17/18 303/124 |
| 6,325,466 B1 * | 12/2001 | Robertson | B60T 13/74 303/124 |
| 6,516,925 B1 * | 2/2003 | Napier | B60T 1/10 188/112 A |
| 6,557,952 B1 * | 5/2003 | Robertson | B60T 13/74 303/122.08 |
| 6,619,759 B2 * | 9/2003 | Bradsen | B60T 7/20 188/206 R |
| 6,652,038 B1 * | 11/2003 | Frye | B60T 7/20 303/7 |
| 6,752,474 B1 * | 6/2004 | Olberding | B60T 7/20 188/112 R |
| 6,845,851 B1 * | 1/2005 | Donaldson | B60T 7/16 188/3 H |
| 6,891,468 B2 * | 5/2005 | Koenigsberg | B60T 8/885 303/20 |
| 7,021,723 B1 * | 4/2006 | Kaufman | B60T 13/66 303/20 |
| 7,273,260 B2 * | 9/2007 | Gray | B60T 17/18 188/3 R |
| 7,311,364 B2 | 12/2007 | Robertson | |
| 7,347,507 B1 * | 3/2008 | Stillinger | B60T 7/20 303/20 |
| 7,415,325 B2 * | 8/2008 | Knosmann | B60D 1/62 280/400 |
| D584,695 S * | 1/2009 | Hilsbos | D13/168 |
| 7,575,286 B2 | 8/2009 | Robertson | |
| 7,932,623 B2 * | 4/2011 | Burlak | B60D 1/62 307/9.1 |
| 8,127,600 B2 * | 3/2012 | Olson | B60T 7/08 73/121 |
| 8,145,402 B2 * | 3/2012 | Craig | B60W 30/00 701/80 |
| 8,165,768 B2 * | 4/2012 | Leschuk | B60T 7/12 303/123 |
| 8,571,777 B2 * | 10/2013 | Greene | B60D 1/30 701/70 |
| 8,700,285 B2 * | 4/2014 | Barlsen | B60Q 1/305 340/431 |
| 8,909,426 B2 * | 12/2014 | Rhode | B62D 13/06 280/426 |
| 9,020,729 B2 * | 4/2015 | Maitlen | B60T 8/1701 701/70 |
| 9,150,201 B2 * | 10/2015 | Smith | B60T 7/20 |
| 9,321,468 B2 * | 4/2016 | Leonard | B61H 13/02 |
| 9,440,627 B2 * | 9/2016 | Kurtovic | B60T 8/1708 |
| 2002/0038974 A1 * | 4/2002 | Lamke | B60T 11/108 303/7 |
| 2002/0047684 A1 * | 4/2002 | Robertson | B60T 8/1708 318/762 |
| 2002/0095251 A1 * | 7/2002 | Oh | B60T 7/20 701/70 |
| 2002/0123837 A1 * | 9/2002 | Eccleston | B60T 17/22 701/70 |
| 2002/0180257 A1 * | 12/2002 | Gill | B60T 8/323 303/7 |
| 2003/0038534 A1 * | 2/2003 | Barnett | B60T 8/1708 303/7 |
| 2003/0168908 A1 * | 9/2003 | Robinson | B60T 7/10 303/7 |
| 2004/0026987 A1 * | 2/2004 | Davis | B60T 7/08 303/3 |
| 2004/0245849 A1 * | 12/2004 | Kissel | B60T 8/1708 303/7 |
| 2005/0077780 A1 * | 4/2005 | Robertson | B60T 13/74 303/7 |
| 2005/0127747 A1 * | 6/2005 | Robertson | B60T 13/74 303/20 |
| 2006/0076827 A1 * | 4/2006 | Albright | B60T 7/20 303/123 |
| 2006/0176166 A1 * | 8/2006 | Smith | B60L 3/00 340/479 |
| 2006/0214506 A1 * | 9/2006 | Albright | B60T 7/20 303/123 |
| 2007/0024107 A1 * | 2/2007 | Marsden | B60K 35/00 303/7 |
| 2007/0114836 A1 * | 5/2007 | Kaminski | B60T 7/06 303/7 |
| 2008/0296968 A1 * | 12/2008 | Culbert | B60T 7/20 303/20 |
| 2008/0309156 A1 * | 12/2008 | Kissel | B60T 7/20 303/20 |
| 2010/0152920 A1 * | 6/2010 | McCann | B60T 13/746 701/2 |
| 2010/0222979 A1 * | 9/2010 | Culbert | B60T 7/20 701/70 |
| 2014/0350812 A1 * | 11/2014 | Robertson | B60T 8/1708 701/70 |
| 2016/0137174 A1 * | 5/2016 | Valenzano | B60T 8/1708 701/70 |

* cited by examiner

SYSTEMS FOR CONTROLLING TRAILER BRAKE OUTPUT CIRCUITS AND SYSTEMS FOR MONITORING MANUAL TRAILER BRAKE ACTIVATION SLIDER CIRCUITS

CLAIM OF PRIORITY

This application claims the benefit of U.S. Provisional Application No. 62/086,399, entitled "Systems For Controlling Trailer Brake Output Circuits And Systems For Monitoring Manual Trailer Brake Activation Slider Circuits," filed Dec. 2, 2014, the entirety of which is hereby incorporated by reference.

TECHNICAL FIELD

The present specification generally relates to trailer brake control systems and, more specifically, to systems for controlling trailer brake output circuits and to systems for monitoring manual trailer brake activation slider circuits.

BACKGROUND

Trailers (e.g., recreational trailers, utility trailers, boat trailers, semi-trailers, and the like) may be towed by towing vehicles (e.g., automobiles and trucks). Some trailers are provided with electric-over-hydraulic trailer braking systems, which typically include hydraulic trailer brakes and an electric-over-hydraulic brake actuator coupled to the trailer that receives an electrical activation signal from a trailer brake controller and provides hydraulic pressure to the hydraulic trailer brakes upon receipt of the electrical activation signal.

Some trailers are provided with electric trailer braking systems, which typically include electric trailer brakes having brake shoes that frictionally engage a drum when activated. In such systems, an electromagnet is typically mounted on one end of a lever in order to actuate the brake shoes. When an electric current is applied to the electromagnet, the lever is pivoted as the electromagnet is drawn against the rotating brake drum, thereby actuating the electric trailer brakes.

Both electric-over-hydraulic trailer braking systems and electric braking systems are controlled by a trailer brake controller, which is generally coupled to a towing vehicle. The trailer brake controller controls a trailer brake output circuit that provides electric current to control the application of the trailer brakes.

Some trailer brake control systems include a manual slider, which may be manipulated by a user to manually apply the trailer brakes. Such systems include a manual trailer brake activation slider circuit that outputs a signal used by the trailer brake control system to manually control the trailer brakes. Such a manual trailer brake activation slider circuit may malfunction in a variety of ways.

Accordingly, a need exists for systems for controlling trailer brake output circuits and to systems for monitoring manual trailer brake activation slider circuits.

SUMMARY

In one embodiment, a system for controlling a trailer brake output circuit includes one or more processors, one or more memory modules communicatively coupled to the one or more processors, a trailer brake output circuit communicatively coupled to the one or more processors, a manual trailer brake activation slider circuit communicatively coupled to the one or more processors, and machine readable instructions stored in the one or more memory modules. The trailer brake output circuit outputs a trailer brake output signal. The manual trailer brake activation slider circuit includes at least one potentiometer that outputs a potentiometer output signal having a voltage that ranges between a minimum output voltage and a maximum output voltage. The machine readable instructions, when executed by the one or more processors, cause the system to compare the voltage of the potentiometer output signal to a threshold voltage, and control the trailer brake output circuit based on the comparison of the voltage of the potentiometer output signal to the threshold voltage. The threshold voltage is greater than the minimum output voltage of the potentiometer output signal and less than the maximum output voltage of the potentiometer output signal.

In another embodiment, a system for monitoring a manual trailer brake activation slider circuit includes one or more processors, one or more memory modules communicatively coupled to the one or more processors, a manual trailer brake activation slider circuit communicatively coupled to the one or more processors, and machine readable instructions stored in the one or more memory modules. The manual trailer brake activation slider circuit includes at least one potentiometer that outputs a potentiometer output signal having a voltage that ranges between a minimum output voltage and a maximum output voltage. When executed by the one or more processors, the machine readable instructions cause the system to compare the voltage of the potentiometer output signal to a threshold voltage, and monitor the manual trailer brake activation slider circuit for a malfunction condition based on the comparison of the voltage of the potentiometer output signal to the threshold voltage. The threshold voltage is greater than the minimum output voltage of the potentiometer output signal and less than the maximum output voltage of the potentiometer output signal.

In yet another embodiment, a system for controlling a trailer brake output circuit includes one or more processors, one or more memory modules communicatively coupled to the one or more processors, a trailer brake output circuit communicatively coupled to the one or more processors, a manual trailer brake activation slider circuit communicatively coupled to the one or more processors, and machine readable instructions stored in the one or more memory modules. The trailer brake output circuit outputs a trailer brake output signal. The manual trailer brake activation slider circuit includes a first potentiometer that outputs a first potentiometer output signal having a voltage that ranges between a first minimum output voltage and a first maximum output voltage, and a second potentiometer that outputs a second potentiometer output signal having a voltage that ranges between a second minimum output voltage and a second maximum output voltage. When executed by the one or more processors, the machine readable instructions cause the system to compare the voltage of the first potentiometer output signal to a lower threshold voltage, compare the voltage of the first potentiometer output signal to an upper threshold voltage, compare the voltage of the first potentiometer output signal to the voltage of the second potentiometer output signal, and control the trailer brake output circuit based on the comparison of the voltage of the first potentiometer output signal to the lower threshold voltage, the comparison of the first potentiometer output signal to the upper threshold voltage, and the comparison of the voltage of the first potentiometer output signal to the voltage of the second potentiometer output signal. The lower threshold voltage is greater than the first minimum output voltage. The upper threshold voltage is greater than the lower threshold voltage and less than the first maximum output voltage These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
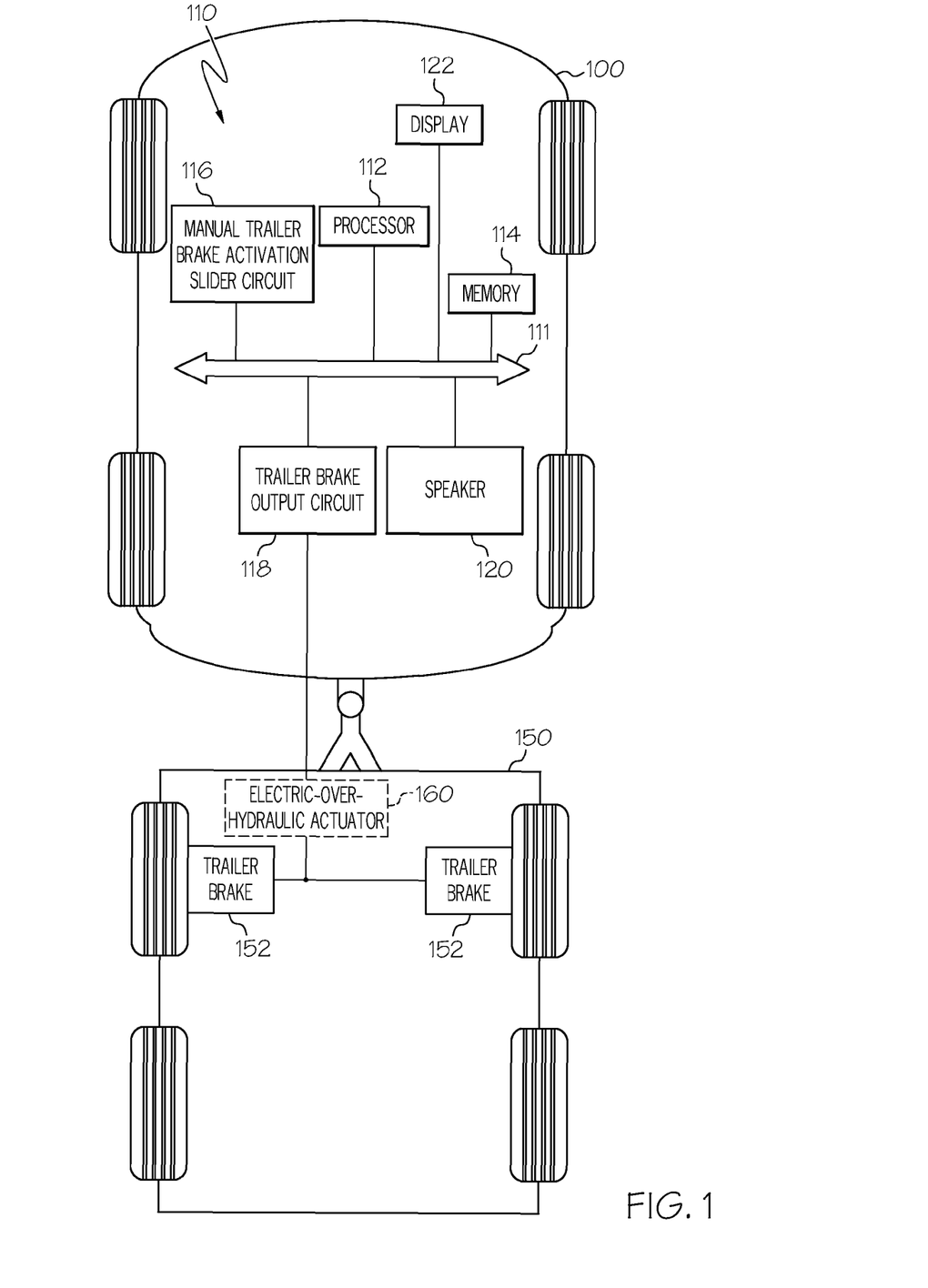
FIG. 1 schematically depicts a vehicle including a trailer brake control system coupled to a trailer including trailer brakes, according to one or more embodiments shown and described herein.
Figure 2:
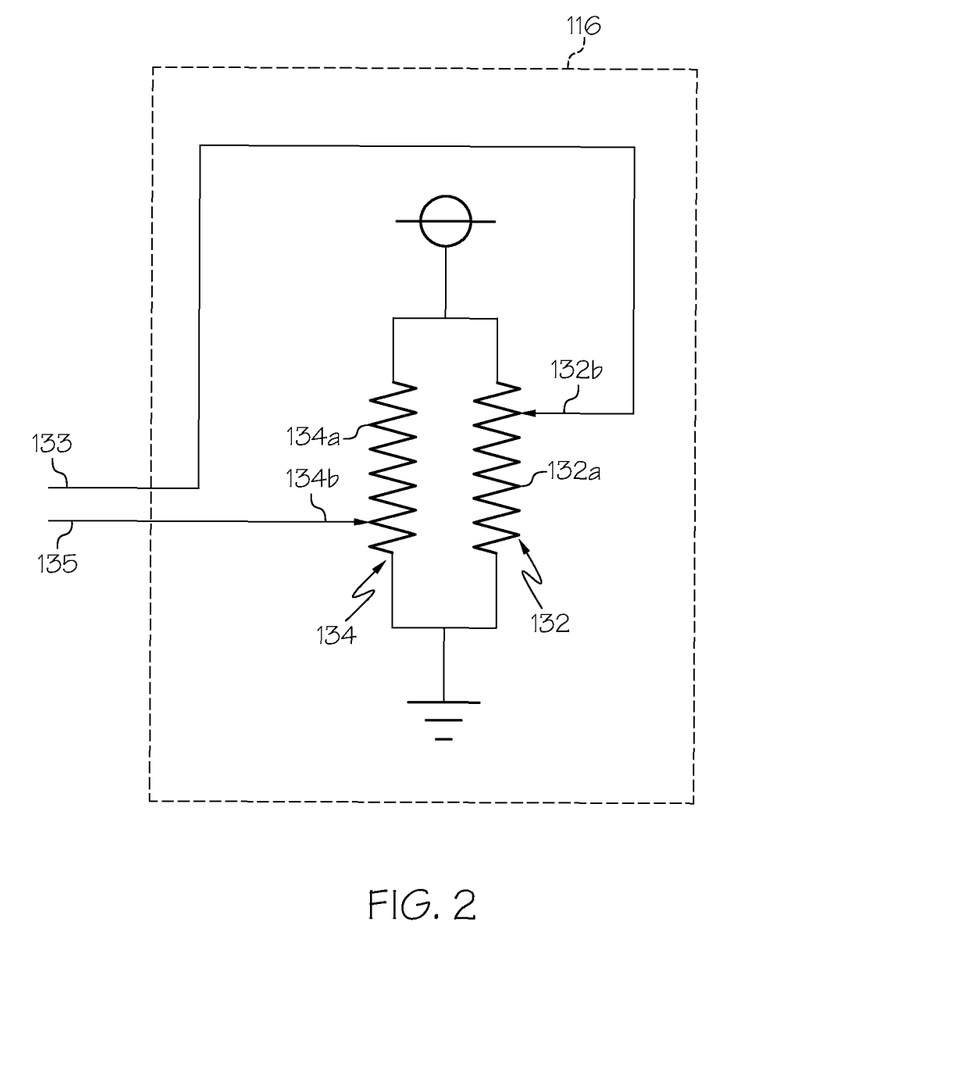
FIG. 2 schematically depicts a manual trailer brake activation slider circuit, according to one or more embodiments shown and described herein.

The embodiments disclosed herein include systems for controlling trailer brake output circuits and to systems for monitoring manual trailer brake activation slider circuits. Referring generally to FIGS. 1 and 2, a system includes one or more processors, one or more memory modules communicatively coupled to the one or more processors, a trailer brake output circuit communicatively coupled to the one or more processors, a manual trailer brake activation slider circuit communicatively coupled to the one or more processors, and machine readable instructions stored in the one or more memory modules. The manual trailer brake activation slider circuit includes at least one potentiometer that outputs a potentiometer output signal having a voltage that ranges between a minimum output voltage and a maximum output voltage. When executed by the one or more processors, the machine readable instructions may cause the system to compare the voltage of the potentiometer output signal to a threshold voltage that is greater than the minimum output voltage of the potentiometer output signal and less than the maximum output voltage of the potentiometer output signal, and control the trailer brake output circuit based on the comparison of the voltage of the potentiometer output signal to the threshold voltage. When executed by the one or more processors, the machine readable instructions may cause the system to alternatively or additionally compare the voltage of the potentiometer output signal to a threshold voltage that is greater than the minimum output voltage of the potentiometer output signal and less than the maximum output voltage of the potentiometer output signal, and monitor the manual trailer brake activation slider circuit for a malfunction condition based on the comparison of the voltage of the potentiometer output signal to the threshold voltage. The various systems for controlling trailer brake output circuits and to systems for monitoring manual trailer brake activation slider circuits will be described in more detail herein with specific reference to the corresponding drawings.

Referring now to FIG. 1, an embodiment of a vehicle 100 including a system 110 for controlling an application of a plurality of trailer brakes 152 of a trailer 150 connected to the vehicle 100 is schematically depicted. The vehicle 100 may be an automobile or any other passenger or non-passenger vehicle such as, for example, a tractor or a tractor truck.

The trailer 150 may be any unpowered vehicle including one or more wheels capable of being pulled by the vehicle 100 such as, for example, a recreational trailer, a utility trailer, a boat trailer, a semi-trailer, and the like. As depicted in FIG. 1, the plurality of trailer brakes 152 includes two trailer brakes, one coupled to each wheel of the front axle. However, it should be understood that in other embodiments, the plurality of trailer brakes 152 may include more than two trailer brakes, such as in embodiments in which the plurality of trailer brakes 152 includes multiple axles with two trailer brakes associated with each axle. In some embodiments in which the trailer 150 employs an electric-over-hydraulic braking system, the plurality of trailer brakes 152 may be a plurality of hydraulic trailer brakes and the trailer 150 may include an electric-over-hydraulic actuator 160 that receives an electrical activation signal from the system 110 and transforms the received electrical activation signal to a hydraulic pressure that activates the plurality of hydraulic trailer brakes, as will be described in further detail below. In embodiments in which the trailer 150 employs an electric braking system, the plurality of trailer brakes 152 may be a plurality of electric trailer brakes and the trailer 150 may not include the electric-over-hydraulic actuator 160.

The system 110 includes a communication path 111, one or more processors 112, one or more memory modules 114, a manual trailer brake activation slider circuit 116, a trailer brake output circuit 118, an optional speaker 120, and an optional display 122. The various components of the system 110 and the interaction thereof will be described in detail below.

The communication path 111 may be formed from any medium that is capable of transmitting a signal such as, for example, conductive wires, conductive traces, optical waveguides, or the like. Moreover, the communication path 111 may be formed from a combination of mediums capable of transmitting signals. In one embodiment, the communication path 111 comprises a combination of conductive traces, conductive wires, connectors, and buses that cooperate to permit the transmission of electrical data signals to components such as processors, memories, sensors, input devices, output devices, and communication devices. Accordingly, the communication path 111 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 111 communicatively couples the various components of the system 110. As used herein, the term "communicatively coupled" means that coupled components are capable of exchanging data signals with one another such as, for example, electrical signals via conductive medium, electromagnetic signals via air, optical signals via optical waveguides, and the like.

Each of the one or more processors 112 of the system 110 may be any device capable of executing machine readable instructions. Accordingly, each of the one or more processors 112 may be a controller, an integrated circuit, a microchip, a computer, or any other computing device. The one or more processors 112 are communicatively coupled to the other components of the system 110 by the communication path 111. Accordingly, the communication path 111 may communicatively couple any number of processors with one another, and allow the components coupled to the communication path 111 to operate in a distributed computing environment. Specifically, each of the components may operate as a node that may send and/or receive data.

Each of the one or more memory modules 114 of the system 110 is coupled to the communication path 111 and communicatively coupled to the one or more processors 112. The one or more memory modules 114 may comprise RAM, ROM, flash memories, hard drives, or any device capable of storing machine readable instructions such that the machine readable instructions can be accessed and executed by the one or more processors 112. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 114. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 1, the manual trailer brake activation slider circuit 116 is coupled to the communication path 111 and communicatively coupled to the one or more processors 112. The manual trailer brake activation slider circuit 116 provides at least one trailer brake activation signal to the one or more processors 112 that may be processed in order to determine when the at least one trailer brake 152 is to be activated. The manual trailer brake activation slider circuit 116 includes at least one potentiometer that outputs a potentiometer output signal having a voltage that ranges between a minimum output voltage and a maximum output voltage. For example, referring to FIG. 2, the manual trailer brake activation slider circuit 116 includes a first potentiometer 132 and a second potentiometer 134. The first potentiometer 132 includes a stationary resistor element 132a (e.g., a printed resistance element) and a movable contact 132b. The movable contact 132b of the first potentiometer 132 is mechanically coupled to a slider and traverses a length of the first potentiometer 132 as the slider moves linearly, as will be described below in conjunction with FIGS. 3A-3B. Likewise, the second potentiometer 134 includes a stationary resistor element 134a (e.g., a printed resistance element) and a movable contact 134b. The movable contact 134b of the second potentiometer 134 is mechanically coupled to the slider and traverses a length of the second potentiometer 134 as the slider moves linearly. The first potentiometer 132 outputs a first potentiometer output signal from a first potentiometer output conductor 133 that varies as a function of the linear position of the movable contact 132b along the length of the first potentiometer 132. The first potentiometer output signal has a voltage that ranges between a first minimum output voltage and a first maximum output voltage. The second potentiometer 134 outputs a second potentiometer output signal from a second potentiometer output conductor 135 that varies as a function of the linear position of the movable contact 134b along the length of the second potentiometer 134. The second potentiometer output signal has a voltage that ranges between a second minimum output voltage and a second maximum output voltage. The first potentiometer 132 and the second potentiometer 134 are coupled to the communication path 111 and communicatively coupled to the one or more processors 112. In some embodiments, the first potentiometer output conductor 133 and the second potentiometer output conductor 135 are electrically connected to input pins of a microcontroller (e.g., analog to digital conversion pins), such as in embodiments in which a microcontroller includes the one or more processors 112 and the one or more memory modules 114.

Figure 3A:
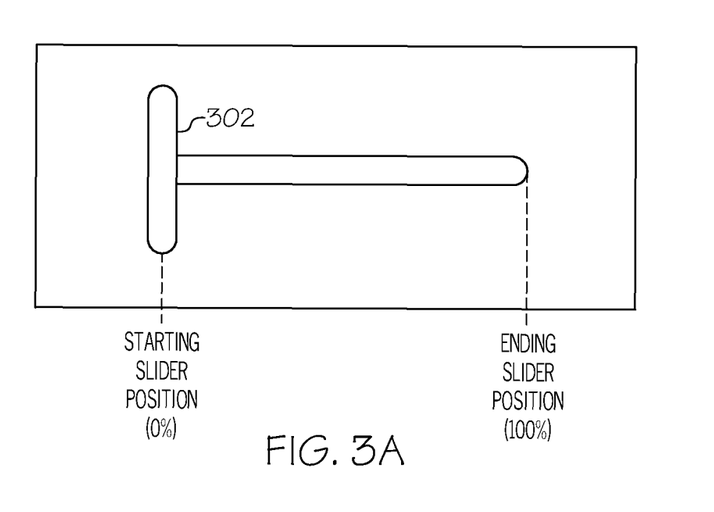
FIG. 3A schematically depicts a slider movable from a starting slider position to an ending slider position, according to one or more embodiments shown and described herein.

Referring now to FIG. 3A, a slider 302 is schematically depicted. The slider 302 is operable to linearly traverse from a starting slider position to an ending slider position and may allow a user to manually control the application of the at least one trailer brake 152. Referring to FIG. 3A in conjunction with FIG. 2, the movable contact 132b of the first potentiometer 132 is mechanically coupled to the slider 302, such that the movable contact 132b of the first potentiometer 132 traverses a length of the first potentiometer 132 as the slider 302 moves linearly from the starting slider position to the ending slider position. Likewise, the movable contact 134b of the second potentiometer 134 is mechanically coupled to the slider 302, such that the movable contact 134b of the second potentiometer 134 traverses a length of the second potentiometer 134 as the slider 302 moves linearly from the starting slider position to the ending slider position. The first potentiometer output signal and the second potentiometer output signal generally vary as a function of the position of the slider 302 and may be used to control the application of the at least one trailer brake 152 when the first potentiometer output signal and the second potentiometer output signal are provided to the trailer brake output circuit 118, which may vary the trailer brake output signal as a function of the first potentiometer output signal and the second potentiometer output signal.

Figure 3B:
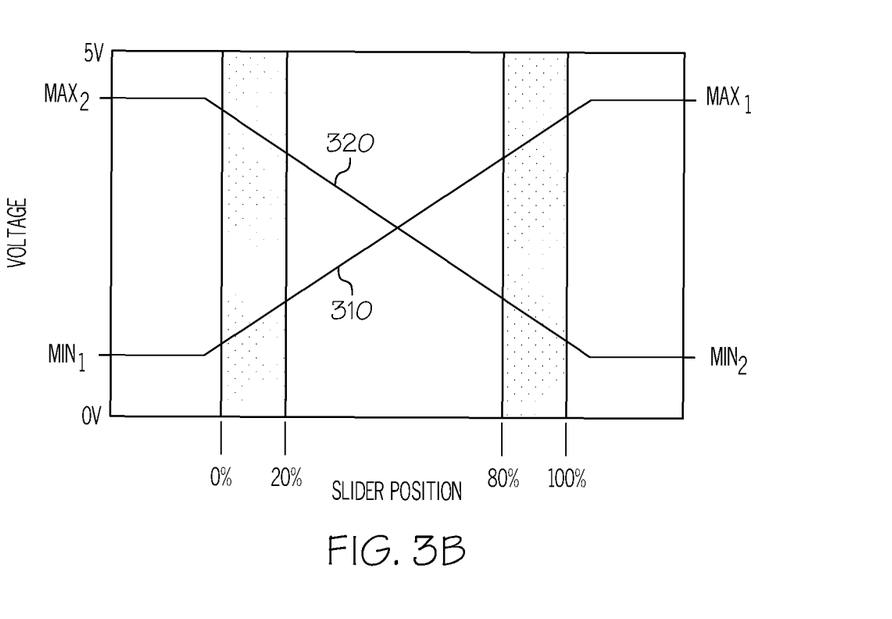
FIG. 3B schematically depicts a plot of the output voltage of a first potentiometer output signal and the output voltage of a second potentiometer output signal as a function of slider position, according to one or more embodiments shown and described herein.

Referring to FIG. 3B (depicting a plot of the output voltage of the first potentiometer output signal 310 and the second potentiometer output signal 320 as a function of slider position) in conjunction with FIGS. 2 and 3A, the first potentiometer 132 outputs a first potentiometer output signal 310 having a voltage that ranges between a first minimum output voltage $min_1$ and a first maximum output voltage $max_1$. The second potentiometer 134 outputs a second potentiometer output signal 320 having a voltage that ranges between a second minimum output voltage $min_1$ and a second maximum output voltage $max_1$. The output profile of the first potentiometer 132 and the second potentiometer 134 is a two cross output profile because the first potentiometer 132 outputs a first potentiometer output signal 310 having a voltage that increases as the slider 302 traverses from a starting slider position (e.g., 0%) to an ending slider position (e.g., 100%), and the second potentiometer 134 outputs a second potentiometer output signal 320 having a voltage that decreases as the slider traverses from the starting slider position (e.g., 0%) to the ending slider position (e.g., 100%).

While the manual trailer brake activation slider circuit 116 depicted in FIG. 2 and described above with reference to FIGS. 3A and 3B includes two potentiometers that have a two cross output profile, embodiments are not limited thereto. In some embodiments, the manual trailer brake activation slider circuit 116 may only include a single potentiometer. In some embodiments, the manual trailer brake activation slider circuit 116 may include more than two potentiometers. In some embodiments in which the manual trailer brake activation slider circuit 116 includes two potentiometers, the potentiometers may not provide cross output, such as when a first potentiometer outputs a first potentiometer output signal having a voltage that increases as the slider traverses from a starting slider position to an ending slider position, and the second potentiometer outputs a second potentiometer output signal having a voltage that increases as the slider traverses from the starting slider position to the ending slider position.

Figure 5:
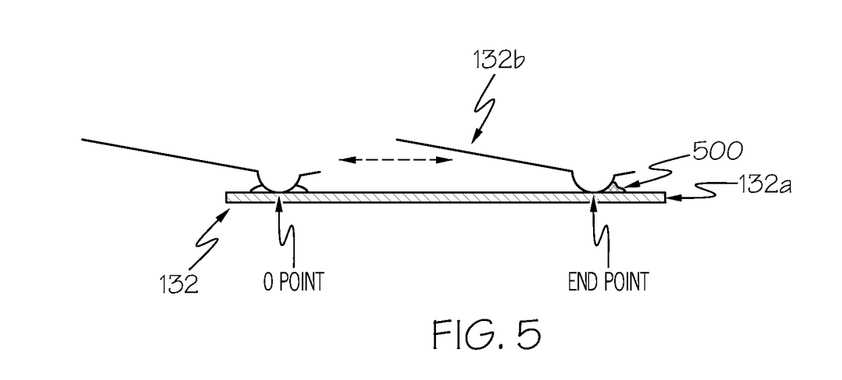
FIG. 5 schematically depicts a resistor element of a potentiometer on which shaven powder has accumulated proximate a zero point and end point, according to one or more embodiments shown and described herein.

Referring to FIG. 5, undesirable shaven powder 500 may accumulate near a zero point or an end point of the stationary resistor element 132a of the first potentiometer 132. The shaven powder 500 may be shaven from the stationary resistor element 132a by the movable contact 132b of the first potentiometer 132. The shaven powder 500 may accumulate near the zero point as a result of vehicle vibration, such as when the movable contact 132b is positioned over the zero point when the slider is in the starting slider position, and the movement of the movable contact 132b caused by the vehicle vibration causes the movable contact 132b to shave powder from the stationary resistor element 132a. The shaven powder 500 may accumulate near the end point as a result of the movable contact 132b moving across the surface of the stationary resistor element 132a. The shaven powder 500 is undesirable because when the movable contact 132b traverses over top of the shaven powder 500, the potentiometer output signal may be influenced by the powder, thereby potentially rendering the potentiometer output signal unreliable. When the potentiometer output signal is unreliable, a position of the slider may not be able to be determined. Furthermore, the system may not be able to distinguish which potentiometer output signal is correct, which may lead to an undesirable level of trailer braking. Moreover, the system may falsely indicate malfunction conditions, which may require unnecessary service trips and hassle for a driver. The embodiments described herein alleviate these problems, as will be described below.

Referring again to FIG. 1, the trailer brake output circuit 118 is coupled to the communication path 111 and communicatively coupled to the one or more processors 112. In embodiments in which the trailer 150 employs an electric trailer braking system, the trailer brake output circuit 118 is electrically coupled to the plurality of trailer brakes 152 by a conductive medium, such as a conductive wire. In embodiments in which the trailer 150 employs an electric-over-hydraulic braking system, the trailer brake output circuit 118 is electrically coupled to the electric-over-hydraulic actuator 160 by a conductive medium, such as a conductive wire. The trailer brake output circuit 118 is controlled by the one or more processors 112 and supplies a trailer brake output signal, such as a voltage or current, directly to the plurality of trailer brakes 152 (in embodiments in which the trailer 150 employs an electric braking system) or to the electric-over-hydraulic actuator 160 (in embodiments in which the trailer 150 employs an electric-over-hydraulic braking system) via the conductive medium when commanded by the one or more processors 112. The trailer brake output signal may be controlled based on one or more signals output by the manual trailer brake activation slider circuit 116. In some embodiments, the trailer brake output circuit 118 may supply current from the power system of the vehicle 100. The trailer brake output circuit 118 generally includes one or more electrical components, such as resistors, capacitors, transistors, inductors, and the like. In some embodiments, the trailer brake output circuit 118 may include at least one power transistor, such as a MOSFET transistor.

Still referring to FIG. 1, in some embodiments, the trailer brake output circuit 118 outputs a trailer brake output signal in response to a pulse-width modulated trailer brake output command signal having a duty cycle. In such embodiments, the trailer brake output circuit 118 may generate the trailer brake output signal in proportion to the duty cycle of the pulse-width modulated trailer brake output command signal. However, it should be understood that in other embodiments, the trailer brake output circuit 118 may output the trailer brake output signal in response to a trailer brake output command signal having a waveform other than a pulse-width modulated waveform.

Referring still to FIG. 1, the system 110 comprises a display 122 for providing visual output such as, for example, information or notifications pertaining to detected malfunction conditions of the manual trailer brake activation slider circuit 116, as described below. The display 122 is coupled to the communication path 111 and communicatively coupled to the one or more processors 112. The display 122 may include any medium capable of transmitting an optical output such as, for example, light emitting diodes, a liquid crystal display, a plasma display, or the like. In some embodiments, the display 122 may include a combination meter positioned on a dashboard of the vehicle 100. It is noted that the display 122 can include at least one of the one or more processors 112 and/or at least one of the one or memory modules 114. Additionally, it should be understood that in some embodiments, the system 110 does not include the display 122, such as in embodiments in which the system 110 does not provide visual output of information or notifications pertaining to the malfunction conditions of the manual trailer brake activation slider circuit 116.

The system 110 depicted in FIG. 1 comprises a speaker 120 for transforming data signals from the system 110 into mechanical vibrations, such as in order to provide an audible indication of the malfunction conditions of the manual trailer brake activation slider circuit 116. The speaker 120 is coupled to the communication path 111 and communicatively coupled to the one or more processors 112. However, it should be understood that in other embodiments the system 110 may not include the speaker 120, such as in embodiments in which the system 110 does not provide an audible indication of the malfunction conditions of the manual trailer brake activation slider circuit 116.

Figure 4:
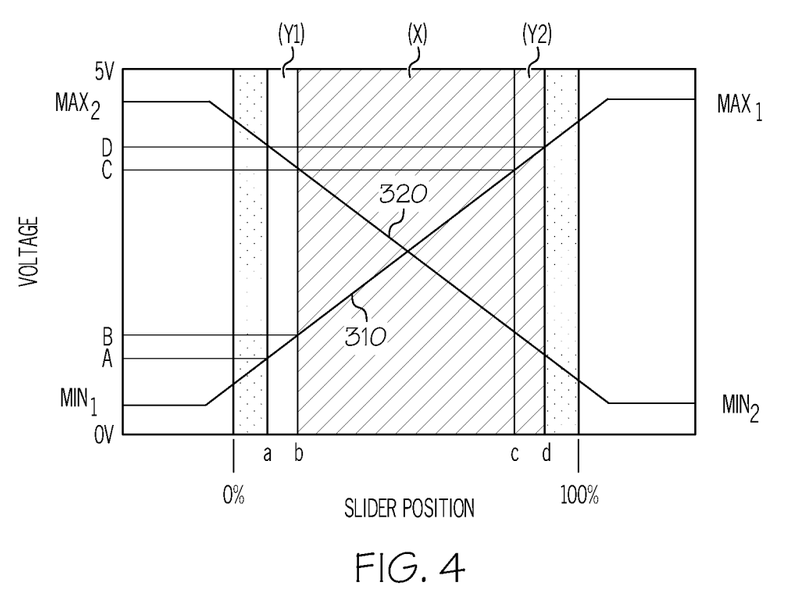
FIG. 4 schematically depicts a plot of the output voltage of a first potentiometer output signal and the output voltage of a second potentiometer output signal as a function of slider position, according to one or more embodiments shown and described herein.

Methods for controlling the trailer brake output circuit 118 and methods for monitoring the manual trailer brake activation slider circuit 116 will be described below with reference to FIG. 4. By way of an introduction to FIG. 4, FIG. 4 schematically depicts a plot of the output voltage of a first potentiometer output signal 310 (output by the first potentiometer 132) and the output voltage of a second potentiometer output signal 320 (output by the second potentiometer 134) as a function of slider position when the manual trailer brake activation slider circuit 116 is operating in a normal mode of operation without malfunction. The first potentiometer output signal 310 has a voltage that ranges between a first minimum output voltage $min_1$ and a first maximum output voltage $max_1$. The second potentiometer output signal 320 has a voltage that ranges between a second minimum output voltage $min_1$ and a second maximum output voltage $max_1$. The first potentiometer output signal 310 has a voltage that increases as the slider traverses from a starting slider position (e.g., 0%) to an ending slider position (e.g., 100%), and the second potentiometer output signal 320 has a voltage that decreases as the slider traverses from the starting slider position (e.g., 0%) to the ending slider position (e.g., 100%). The plot of FIG. 4 includes a voltage A that corresponds to the voltage of the first potentiometer output signal 310 when the slider is at the slider position a and the manual trailer brake activation slider circuit 116 is operating normally. The plot of FIG. 4 includes a voltage B that corresponds to the voltage of the first potentiometer output signal 310 when the slider is at the slider position b and the manual trailer brake activation slider circuit 116 is operating normally. The plot of FIG. 4 includes a voltage C that corresponds to the voltage of the first potentiometer output signal 310 when the slider is at the slider position c and the manual trailer brake activation slider circuit 116 is operating normally. The plot of FIG. 4 includes a voltage D that corresponds to the voltage of the first potentiometer output signal 310 when the slider is at the slider position d and the manual trailer brake activation slider circuit 116 is operating normally. In some embodiments, the slider position b is 20% and the slider position d is 80%, though embodiments are not limited thereto.

Still referring to FIG. 4, the plot includes an area X that spans between the slider position b and the slider position c. The plot of FIG. 4 includes an area Y1 that spans between the slider position a and the slider position b. The plot of FIG. 4 includes an area Y2 that spans between the slider position c and the slider position d. The slider positions between 0% and a and between d and 100% may be at slider positions at which minimal accumulated shaven powder is present on the resistance element of the potentiometers. The distance between the slider position a and the slider position b may be sufficient to allow more than one sample of the potentiometer output signals when the slider is moved at a maximum speed between the slider position a and the slider position b. Likewise, the distance between the slider position c and the slider position d may be sufficient to allow more than one sample of the potentiometer output signals when the slider is moved at a maximum speed between the slider position c and the slider position d.

Methods for controlling the trailer brake output circuit 118 and methods for monitoring the manual trailer brake activation slider circuit 116 will be described in turn.

Controlling the Trailer Brake Output Circuit

Referring to FIGS. 1 and 2, a method of controlling the trailer brake output circuit 118 based on the output of the manual trailer brake activation slider circuit 116 will now be described.

The machine readable instructions stored in the one or more memory modules 114, when executed by the one or more processors 112, may cause the system 110 to compare the voltage of the first potentiometer output signal to a lower threshold voltage at a particular point in time. The lower threshold voltage is greater than the first minimum output voltage. For example, referring to FIG. 4, the system 110 may compare the voltage of the first potentiometer output signal 310 to a lower threshold voltage B at a particular point in time. The lower threshold voltage B is greater than the first minimum output voltage $min_1$. Some embodiments may not perform this comparison.

The machine readable instructions stored in the one or more memory modules 114, when executed by the one or more processors 112, may cause the system 110 to compare the voltage of the first potentiometer output signal to an upper threshold voltage at a particular point in time. The upper threshold voltage is greater than the lower threshold voltage and less than the first maximum output voltage. For example, referring to FIG. 4, the system 110 may compare the voltage of the first potentiometer output signal 310 to an upper threshold voltage C at a particular point in time. The upper threshold voltage C is greater than the lower threshold voltage B and less than the first maximum output voltage $max_1$. Some embodiments may not perform this comparison.

The machine readable instructions stored in the one or more memory modules 114, when executed by the one or more processors 112, may cause the system 110 to compare the voltage of the first potentiometer output signal to the voltage of the second potentiometer output signal. For example, referring to FIG. 4, the system 110 may compare the voltage of the first potentiometer output signal 310 to the voltage of the second potentiometer output signal 320 at a particular point in time. In some embodiments, the nominal voltage of the first potentiometer output signal 310 may be compared to the nominal voltage of the second potentiometer output signal 320 at a particular point in time. In some embodiments, the difference of the voltage of the first potentiometer output signal and the first minimum output voltage $min_1$ may be compared to the difference of the voltage of the second potentiometer output voltage and the second maximum output voltage $max_1$. In some embodiments, the comparison may include adding or subtracting the first potentiometer output signal 310 to the second potentiometer output signal 320 and comparing the sum or difference to a threshold value. Some embodiments may not perform this comparison.

The machine readable instructions stored in the one or more memory modules 114, when executed by the one or more processors 112, may cause the system 110 to control the trailer brake output circuit 118 based on one or more of the above-described comparisons. For example in some embodiments, the system controls the trailer brake output circuit 118 based on the comparison of the voltage of the first potentiometer output signal to a lower threshold voltage. For example, referring to FIG. 4, in some embodiments the duty cycle of a pulse-width modulated trailer brake output command signal provided to the trailer brake output circuit 118 is constant (e.g., 0%) when the voltage of the first potentiometer output signal 310 is less than the lower threshold voltage B. The trailer brake output circuit 118 outputs a constant trailer brake output signal in response to the constant pulse-width modulated trailer brake output command signal. Thus, in this example, the trailer brake output circuit 118 outputs a constant trailer brake output signal when the voltage of the first potentiometer output signal is less than the lower threshold voltage.

In some embodiments, the system controls the trailer brake output circuit 118 based on the comparison of the voltage of the first potentiometer output signal to an upper threshold voltage. For example, referring to FIG. 4, in some embodiments the duty cycle of a pulse-width modulated trailer brake output command signal provided to the trailer brake output circuit 118 is constant (e.g., 100%) when the voltage of the first potentiometer output signal 310 is greater than the upper threshold voltage C. The trailer brake output circuit 118 outputs a constant trailer brake output signal in response to the constant pulse-width modulated trailer brake output command signal. Thus, in this example, the trailer brake output circuit 118 outputs a constant trailer brake output signal when the voltage of the first potentiometer output signal is greater than the upper threshold voltage.

In some embodiments, the system controls the trailer brake output circuit 118 based on the comparison of the voltage of the first potentiometer output signal to an upper threshold voltage and to a lower threshold voltage. For example, referring to FIG. 4, in some embodiments the duty cycle of a pulse-width modulated trailer brake output command signal provided to the trailer brake output circuit 118 is proportional to the voltage of the first potentiometer output signal 310 when the voltage of the first potentiometer output signal 310 is greater than the lower threshold voltage B and the voltage of the first potentiometer output signal 310 is less than the upper threshold voltage C. The trailer brake output circuit 118 outputs a proportional trailer brake output signal in response to the proportional pulse-width modulated trailer brake output command signal. Thus, in this example, the trailer brake output circuit 118 outputs a trailer brake output signal that is proportional to the first potentiometer output signal when the voltage of the first potentiometer output signal is greater than the lower threshold voltage and less than the upper threshold voltage.

In some embodiments, the system controls the trailer brake output circuit 118 based on the comparison of the voltage of the first potentiometer output signal to the lower threshold voltage, the comparison of the first potentiometer output signal to the upper threshold voltage, and the comparison of the voltage of the first potentiometer output signal to the voltage of the second potentiometer output signal. For example, referring to FIG. 4, in some embodiments the duty cycle of a pulse-width modulated trailer brake output command signal provided to the trailer brake output circuit 118 is: (i) constant (e.g., 0%) when the voltage of the first potentiometer output signal 310 is less than the lower threshold voltage B; (ii) proportional to the voltage of the first potentiometer output signal 310 when the voltage of the first potentiometer output signal 310 is greater than the lower threshold voltage B and the voltage of the first potentiometer output signal 310 is less than the upper threshold voltage C; and (iii) constant (e.g., 100%) when the voltage of the first potentiometer output signal 310 is greater than the upper threshold voltage C. The trailer brake output circuit 118 outputs a trailer brake output signal in response to the pulse-width modulated trailer brake output command signal.

In some embodiments, machine readable instructions stored in the one or more memory modules 114, when executed by the one or more processors 112, may cause the system 110 to: (i) determine whether the first potentiometer output signal and the second potentiometer output signal are valid based on the above-described comparison of the voltage of the first potentiometer output signal to the voltage of the second potentiometer output signal; and (ii) control the trailer brake output circuit based on whether the potentiometer output signals are determined to be valid. Some embodiments may determine that the first potentiometer output signal and the second potentiometer output signal are valid when the nominal voltage of the first potentiometer output signal and the nominal voltage of the second potentiometer output signal 320 differ by less than a threshold amount. For example, the first potentiometer output signal and the second potentiometer output signal may determined to be valid if the voltage of the first potentiometer output signal is within 0.1 V of the voltage of the second potentiometer output signal. Some embodiments may determine that the first potentiometer output signal and the second potentiometer output signal are valid when the difference of the voltage of the first potentiometer output signal and the first minimum output voltage $min_1$ differs from the difference of the voltage of the second potentiometer output voltage and the second maximum output voltage $max_1$ by less than a threshold amount.

Some embodiments may control the trailer brake output circuit 118 based on whether the potentiometer output signals are determined to be valid by determining a composite potentiometer output signal based on the voltage of the first potentiometer output signal and the voltage of the second potentiometer output signal, and providing a pulse-width modulated trailer brake output command signal having a duty cycle that is proportional to the composite potentiometer output signal when: (i) the voltage of the potentiometer output signal is greater than the lower threshold voltage and less than the upper threshold voltage; and (ii) the first potentiometer output signal and the second potentiometer output signal are determined to be valid. The composite potentiometer output signal may be determined as an average calculated based on the first potentiometer output signal and the second potentiometer output signal, a sum of the first potentiometer output signal and the second potentiometer output signal, a difference of the first potentiometer output signal and the second potentiometer output signal, or the like. For example, referring to FIG. 4, a composite potentiometer output signal may be determined as an average calculated based on the first potentiometer output signal 310 and the second potentiometer output signal 320 at a particular point in time. In particular, in some embodiments, the composite potentiometer output signal may be calculated as (|Pot1_AD−Pot1_0 point_AD|+|Pot2_AD−Pot2_0 point_AD|)/2, where Pot1_AD is the value of the first potentiometer output signal, Pot2_AD is the value of the second potentiometer output signal, Pot1_0_point_AD is the value of the first potentiometer output signal at a zero point (e.g., when the slider is in the initial position), and Pot2_0_point_AD is the value of the second potentiometer output signal at a zero point (e.g., when the slider is in an initial position). In other embodiments, the composite potentiometer output signal may be calculated differently. The duty cycle of a pulse-width modulated trailer brake output command signal provided to the trailer brake output circuit 118 may be proportional to the composite potentiometer output signal when: (i) the voltage of the first potentiometer output signal 310 is greater than the lower threshold voltage B and less than the upper threshold voltage C; and (ii) the first potentiometer output signal 310 and the second potentiometer output signal 320 are determined to be valid. The trailer brake output circuit 118 outputs a proportional trailer brake output signal in response to the proportional pulse-width modulated trailer brake output command signal.

Some embodiments may control the trailer brake output circuit 118 based on whether the potentiometer output signals are determined to be valid by providing a pulse-width modulated trailer brake output command signal having a duty cycle that is a first constant when: (i) the voltage of the first potentiometer output signal is less than the lower threshold voltage; and (ii) the first potentiometer output signal and the second potentiometer output signal are determined to be valid. For example, referring to FIG. 4, in some embodiments the duty cycle of a pulse-width modulated trailer brake output command signal provided to the trailer brake output circuit 118 is constant (e.g., 0%) when: (i) the voltage of the first potentiometer output signal 310 is less than the lower threshold voltage B; and (ii) the first potentiometer output signal 310 and the second potentiometer output signal 320 are determined to be valid. The trailer brake output circuit 118 outputs a constant trailer brake output signal in response to the constant pulse-width modulated trailer brake output command signal.

Some embodiments may control the trailer brake output circuit 118 based on whether the potentiometer output signals are determined to be valid by providing a pulse-width modulated trailer brake output command signal having a duty cycle that is a second constant when: (i) the voltage of the first potentiometer output signal is greater than the upper threshold voltage; and (ii) the first potentiometer output signal and the second potentiometer output signal are determined to be valid. For example, referring to FIG. 4, in some embodiments the duty cycle of a pulse-width modulated trailer brake output command signal provided to the trailer brake output circuit 118 is constant (e.g., 100%) when: (i) the voltage of the first potentiometer output signal 310 is greater than the upper threshold voltage C; and (ii) the first potentiometer output signal 310 and the second potentiometer output signal 320 are determined to be valid. The trailer brake output circuit 118 outputs a constant trailer brake output signal in response to the constant pulse-width modulated trailer brake output command signal.

In some embodiments, when at least one of the first potentiometer output signal and the second potentiometer output signal are determined not to be valid, the trailer brake output signal provided by the trailer brake output circuit 118 remains unchanged, such as by not changing the duty cycle of a pulse-width modulated trailer brake output command signal provided to the trailer brake output circuit 118.

It should be understood that by only outputting a trailer brake output signal that is proportional to one or more potentiometer output signals of the manual trailer brake activation slider circuit 116 when a potentiometer output signal is greater than a lower threshold voltage and/or less than an upper threshold voltage as described above, unreliable trailer brake output conditions (which might otherwise arise as a result of unreliable potentiometer output signals caused by shaven powder that accumulates near the starting slider position and ending slider position) may be avoided.

Monitoring the Manual Trailer Brake Activation Slider Circuit

Referring to FIGS. 1 and 2, a method of monitoring the manual trailer brake activation slider circuit 116 will now be described. The machine readable instructions stored in the one or more memory modules 114, when executed by the one or more processors 112, may cause the system 110 to compare the voltage of the first potentiometer output signal to a lower threshold voltage at a particular point in time. The lower threshold voltage is greater than the first minimum output voltage. For example, referring to FIG. 4, the system 110 may compare the voltage of the first potentiometer output signal 310 to a lower threshold voltage B at a particular point in time. The lower threshold voltage B is greater than the first minimum output voltage $min_1$. Some embodiments may not perform this comparison.

The machine readable instructions stored in the one or more memory modules 114, when executed by the one or more processors 112, may cause the system 110 to compare the voltage of the first potentiometer output signal to an upper threshold voltage at a particular point in time. The upper threshold voltage is greater than the lower threshold voltage and less than the first maximum output voltage. For example, referring to FIG. 4, the system 110 may compare the voltage of the first potentiometer output signal 310 to an upper threshold voltage C at a particular point in time. The upper threshold voltage C is greater than the lower threshold voltage B and less than the first maximum output voltage $max_1$. Some embodiments may not perform this comparison.

The machine readable instructions stored in the one or more memory modules 114, when executed by the one or more processors 112, may cause the system 110 to compare the voltage of the first potentiometer output signal to the voltage of the second potentiometer output signal. For example, referring to FIG. 4, the system 110 may compare the voltage of the first potentiometer output signal 310 to the voltage of the second potentiometer output signal 320 at a particular point in time. In some embodiments, the nominal voltage of the first potentiometer output signal 310 may be compared to the nominal voltage of the second potentiometer output signal 320 at a particular point in time. In some embodiments, the difference of the voltage of the first potentiometer output signal and the first minimum output voltage $min_1$ may be compared to the difference of the voltage of the second potentiometer output voltage and the second maximum output voltage $max_1$. In some embodiments, the comparison may include adding or subtracting the first potentiometer output signal 310 to the second potentiometer output signal 320 and comparing the sum or difference to a threshold value. Some embodiments may not perform this comparison.

The machine readable instructions stored in the one or more memory modules 114, when executed by the one or more processors 112, may cause the system 110 to monitor the manual trailer brake activation slider circuit 116 based on one or more of the above-described comparisons. For example, in some embodiments, the system monitors the manual trailer brake activation slider circuit 116 based on the comparison of the voltage of the first potentiometer output signal to an upper threshold voltage and to a lower threshold voltage. For example, referring to FIG. 4, in some embodiments the system monitors the manual trailer brake activation slider circuit 116 for certain malfunction conditions when the voltage of the first potentiometer output signal 310 is greater than the lower threshold voltage B and the voltage of the first potentiometer output signal 310 is less than the upper threshold voltage C.

In some embodiments, when the voltage of the first potentiometer output signal 310 is greater than the lower threshold voltage B and the voltage of the first potentiometer output signal 310 is less than the upper threshold voltage C for one or more sampling times, the system may monitor the manual trailer brake activation slider circuit 116 for a short circuit malfunction condition and may provide visual or audible output indicative of the short circuit malfunction condition. The short circuit malfunction condition may be determined to exist when the voltage of the first potentiometer output signal or the second potentiometer signal is greater than or less than a short circuit malfunction threshold voltage. For example, with reference to FIG. 4, in some embodiments, the short circuit malfunction condition may be determined to exist when a voltage of the first potentiometer output signal 310 or a voltage of the second potentiometer output signal 320 is less than a ground short voltage threshold, which indicates that one of the potentiometers is shorted to ground. The short circuit malfunction condition may also be determined to exist when a voltage of the first potentiometer output signal 310 or a voltage of the second potentiometer output signal 320 is greater than a power short voltage threshold, which indicates that one of the potentiometers is shorted to power.

In some embodiments, when the voltage of the first potentiometer output signal 310 is greater than the lower threshold voltage B and the voltage of the first potentiometer output signal 310 is less than the upper threshold voltage C for one or more sampling times, the system may monitor the manual trailer brake activation slider circuit 116 for a limit comparison malfunction condition and may provide visual or audible output indicative of the limit comparison malfunction condition. For example, with reference to FIG. 4, the limit comparison malfunction condition may be determined to exist when: (i) a sum of the first potentiometer output signal 310 and the second potentiometer output signal 320 is less than a lower limit; or (ii) a sum of the first potentiometer output signal 310 and the second potentiometer output signal 320 is greater than an upper limit.

In some embodiments, machine readable instructions stored in the one or more memory modules 114, when executed by the one or more processors 112, may cause the system 110 to: (i) determine whether the first potentiometer output signal and the second potentiometer output signal are valid based on the above-described comparison of the voltage of the first potentiometer output signal to the voltage of the second potentiometer output signal; and (ii) monitor the manual trailer brake activation slider circuit 116 based on whether the potentiometer output signals are determined to be valid. Some embodiments may determine that the first potentiometer output signal and the second potentiometer output signal are valid when the nominal voltage of the first potentiometer output signal and the nominal voltage of the second potentiometer output signal 320 differ by less than a threshold amount. For example, the first potentiometer output signal and the second potentiometer output signal may determined to be valid if the voltage of the first potentiometer output signal is within 0.1 V of the voltage of the second potentiometer output signal. Some embodiments may determine that the first potentiometer output signal and the second potentiometer output signal are valid when the difference of the voltage of the first potentiometer output signal and the first minimum output voltage $min_1$ differs from the difference of the voltage of the second potentiometer output voltage and the second maximum output voltage $max_2$ by less than a threshold amount.

Referring to FIG. 4, some embodiments may monitor for a short circuit malfunction condition or a limit comparison malfunction condition when (i) the voltage of the first potentiometer output signal 310 is greater than the lower threshold voltage B and the voltage of the first potentiometer output signal 310 is less than the upper threshold voltage C; and (ii) the first potentiometer output signal and the second potentiometer output signal are determined to be valid. Some embodiments may not monitor for a short circuit malfunction condition or a limit comparison malfunction condition when (i) the voltage of the first potentiometer output signal 310 is less than the lower threshold voltage B or the voltage of the first potentiometer output signal 310 is greater than the upper threshold voltage C; and (ii) the first potentiometer output signal and the second potentiometer output signal are determined to be valid. Some embodiments may not monitor for a short circuit malfunction condition or a limit comparison malfunction condition in area Y1 (i.e., when the voltage of the first potentiometer output signal 310 is between A and B) or area Y2 (i.e., when the voltage of the first potentiometer output signal 310 is between C and D), but will monitor for a short circuit malfunction condition or a limit comparison malfunction condition in area X (i.e., when the voltage of the first potentiometer output signal 310 is between B and C).

In some embodiments, the system may monitor for other malfunction conditions regardless of the voltages of the potentiometer output signals. For example, in some embodiments, the system may always monitor for a stuck malfunction condition and/or a movement comparison failure. The stuck malfunction condition may be determined to exist when the first potentiometer output signal and the second potentiometer output signal indicate that the slider is stuck, such as when the first potentiometer output signal and the second potentiometer output signal are fixed at the same place out of the zero position. The movement comparison failure may be determined to exist when the first potentiometer output signal changes while the second potentiometer output signal stays substantially the same, which may indicate that at least one of the potentiometers is malfunctioning.

In some embodiments, the system does not monitor for malfunction conditions or does not indicate malfunction conditions when the voltage of the first potentiometer output signal 310 is less than the lower threshold voltage B and/or the voltage of the first potentiometer output signal 310 is greater than the upper threshold voltage C. In some embodiments, the system may monitor for malfunction conditions when the voltage of the first potentiometer output signal 310 is less than the lower threshold voltage B or the voltage of the first potentiometer output signal 310 is greater than the upper threshold voltage C, but may not provide visual or audible notifications of such malfunction conditions. By only monitoring for and/or providing audible or visual output indicative of malfunction conditions when the first potentiometer output signal 310 is greater than the lower threshold voltage B and the voltage of the first potentiometer output signal 310 is less than the upper threshold voltage C, the detection of false malfunction conditions (which may otherwise be detected as a result of shaven powder that accumulates near the starting slider position and ending slider position) may be avoided. By avoiding the detection of false malfunction conditions, a driver may avoid unnecessary trips to have the manual trailer brake activation slider circuit 116 serviced when service is not necessary.

In some embodiments a visual indication of a malfunction of the manual trailer brake activation slider circuit 116 may be provided to a driver of the vehicle 100 via the display 122. For example, in some embodiments, the display 122 may illuminate a malfunction indicator to indicate the detection of a malfunction of the manual trailer brake activation slider circuit 116, such as a short circuit malfunction condition, a comparison failure malfunction condition, or the like. Similarly, in some embodiments, an audible indication of a malfunction of the manual trailer brake activation slider circuit 116 may be provided to a driver of the vehicle 100 by the speaker 120. In some embodiments, the speaker 120 may provide an audible indication indicative of a detected malfunction condition, such as by beeping or emitting a tone when a malfunction condition is detected. For example, in some embodiments, a warning sound is emitted when a short circuit malfunction condition is detected. It should be understood that many other types of information may be provided by the display 122 and/or the speaker 120.

It should now be understood that embodiments described herein provide systems for controlling trailer brake output circuits and to systems for monitoring manual trailer brake activation slider circuits. The systems described herein are more reliable and avoid problems potentially caused by shaven powder that may accumulate on resistance elements of potentiometers of manual trailer brake activation input slider circuits.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for controlling a trailer brake output circuit comprising:
   one or more processors;
   one or more memory modules communicatively coupled to the one or more processors;
   the trailer brake output circuit communicatively coupled to the one or more processors, wherein the trailer brake output circuit outputs a trailer brake output signal;
   a manual trailer brake activation slider circuit communicatively coupled to the one or more processors, the manual trailer brake activation slider circuit comprising at least one potentiometer that outputs a potentiometer output signal having a voltage that ranges between a minimum output voltage and a maximum output voltage;
   machine readable instructions stored in the one or more memory modules that cause the system to perform at least the following when executed by the one or more processors:
      compare the voltage of the potentiometer output signal to a threshold voltage, wherein the threshold voltage is greater than the minimum output voltage of the potentiometer output signal and less than the maximum output voltage of the potentiometer output signal; and
      control the trailer brake output circuit based on the comparison of the voltage of the potentiometer output signal to the threshold voltage.

2. The system of claim 1, wherein the trailer brake output circuit outputs the trailer brake output signal in response to a pulse-width modulated trailer brake output command signal having a duty cycle, wherein the machine readable instructions stored in the one or more memory modules cause the system to perform at least the following when executed by the one or more processors:
   provide the pulse-width modulated trailer brake output command signal to the trailer brake output circuit, wherein the duty cycle of the pulse-width modulated trailer brake output command signal is based on the comparison of the voltage of the potentiometer output signal to the threshold voltage; and
   output the trailer brake output signal based on the pulse-width modulated trailer brake output command signal.

3. The system of claim 2, wherein the duty cycle of the pulse-width modulated trailer brake output command signal is constant when the voltage of the potentiometer output signal is less than the threshold voltage.

4. The system of claim 2, wherein the duty cycle of the pulse-width modulated trailer brake output command signal is constant when the voltage of the potentiometer output signal is greater than the threshold voltage.

5. The system of claim 2, wherein the duty cycle of the pulse-width modulated trailer brake output command signal is proportional to the voltage of the potentiometer output signal when the voltage of the potentiometer output signal is less than the threshold voltage.

6. The system of claim 2, wherein the duty cycle of the pulse-width modulated trailer brake output command signal is proportional to the voltage of the potentiometer output signal when the voltage of the potentiometer output signal is greater than the threshold voltage.

7. The system of claim 2, wherein the machine readable instructions stored in the one or more memory modules cause the system to perform at least the following when executed by the one or more processors:
   compare the voltage of the potentiometer output signal to a lower threshold voltage, wherein the lower threshold voltage is greater than the minimum output voltage of the potentiometer output signal; and
   compare the voltage of the potentiometer output signal to an upper threshold voltage, wherein the upper threshold voltage is greater than the lower threshold voltage and less than the maximum output voltage of the potentiometer output signal, wherein:
   the duty cycle of the pulse-width modulated trailer brake output command signal is a first constant when the voltage of the potentiometer output signal is less than the lower threshold voltage;
   the duty cycle of the pulse-width modulated trailer brake output command signal is proportional to the voltage of the potentiometer output signal when the voltage of the potentiometer output signal is greater than the lower threshold voltage and less than the upper threshold voltage; and
   the duty cycle of the pulse-width modulated trailer brake output command signal is a second constant when the voltage of the potentiometer output signal is greater than the upper threshold voltage.

8. The system of claim 7, wherein the first constant is 0% and the second constant is 100%.

9. A system for monitoring a manual trailer brake activation slider circuit comprising:
   one or more processors;
   one or more memory modules communicatively coupled to the one or more processors;
   the manual trailer brake activation slider circuit communicatively coupled to the one or more processors, the manual trailer brake activation slider circuit comprising at least one potentiometer that outputs a potentiometer output signal having a voltage that ranges between a minimum output voltage and a maximum output voltage;
   machine readable instructions stored in the one or more memory modules that cause the system to perform at least the following when executed by the one or more processors:
      compare the voltage of the potentiometer output signal to a threshold voltage, wherein the threshold voltage is greater than the minimum output voltage of the potentiometer output signal and less than the maximum output voltage of the potentiometer output signal; and monitor the manual trailer brake activation slider circuit for a malfunction condition based on the comparison of the voltage of the potentiometer output signal to the threshold voltage.

10. The system of claim 9, wherein the machine readable instructions stored in the one or more memory modules cause the system to perform at least the following when executed by the one or more processors:
compare the voltage of the potentiometer output signal to a lower threshold voltage, wherein the lower threshold voltage is greater than the minimum output voltage of the potentiometer output signal;
compare the voltage of the potentiometer output signal to an upper threshold voltage, wherein the upper threshold voltage is greater than the lower threshold voltage and less than the maximum output voltage of the potentiometer output signal; and
monitor the manual trailer brake activation slider circuit for the malfunction condition when the voltage of the potentiometer output signal is greater than the lower threshold voltage and less than the upper threshold voltage.

11. The system of claim 10, wherein the machine readable instructions stored in the one or more memory modules cause the system to perform at least the following when executed by the one or more processors:
determine that a short circuit malfunction condition exists when the voltage of the potentiometer output signal is greater than or less than a short circuit malfunction threshold voltage.

12. The system of claim 10, wherein the at least one potentiometer includes:
a first potentiometer that outputs a first potentiometer output signal having a voltage that ranges between a first minimum output voltage and a first maximum output voltage; and
a second potentiometer that outputs a second potentiometer output signal having a voltage that ranges between a second minimum output voltage and a second maximum output voltage, wherein the machine readable instructions stored in the one or more memory modules cause the system to perform at least the following when executed by the one or more processors:
determine that a comparison failure malfunction condition exists based on the voltage of the first potentiometer output signal and the voltage of the second potentiometer output signal.

13. A system for controlling a trailer brake output circuit comprising:
one or more processors;
one or more memory modules communicatively coupled to the one or more processors;
the trailer brake output circuit communicatively coupled to the one or more processors, wherein the trailer brake output circuit outputs a trailer brake output signal;
a manual trailer brake activation slider circuit communicatively coupled to the one or more processors, the manual trailer brake activation slider circuit comprising:
a first potentiometer that outputs a first potentiometer output signal having a voltage that ranges between a first minimum output voltage and a first maximum output voltage; and
a second potentiometer that outputs a second potentiometer output signal having a voltage that ranges between a second minimum output voltage and a second maximum output voltage; and
machine readable instructions stored in the one or more memory modules that cause the system to perform at least the following when executed by the one or more processors:
compare the voltage of the first potentiometer output signal to a lower threshold voltage, wherein the lower threshold voltage is greater than the first minimum output voltage;
compare the voltage of the first potentiometer output signal to an upper threshold voltage, wherein the upper threshold voltage is greater than the lower threshold voltage and less than the first maximum output voltage;
compare the voltage of the first potentiometer output signal to the voltage of the second potentiometer output signal; and
control the trailer brake output circuit based on the comparison of the voltage of the first potentiometer output signal to the lower threshold voltage, the comparison of the first potentiometer output signal to the upper threshold voltage, and the comparison of the voltage of the first potentiometer output signal to the voltage of the second potentiometer output signal.

14. The system of claim 13, wherein the trailer brake output circuit outputs the trailer brake output signal in response to a pulse-width modulated trailer brake output command signal having a duty cycle, wherein the machine readable instructions stored in the one or more memory modules cause the system to perform at least the following when executed by the one or more processors:
provide the pulse-width modulated trailer brake output command signal to the trailer brake output circuit, wherein the duty cycle of the pulse-width modulated trailer brake output command signal is based on the comparison of the voltage of the first potentiometer output signal to the lower threshold voltage, the comparison of the first potentiometer output signal to the upper threshold voltage, and the comparison of the voltage of the first potentiometer output signal to the voltage of the second potentiometer output signal; and
output the trailer brake output signal based on the pulse-width modulated trailer brake output command signal.

15. The system of claim 14, wherein the machine readable instructions stored in the one or more memory modules cause the system to perform at least the following when executed by the one or more processors:
determine whether the first potentiometer output signal and the second potentiometer output signal are valid based on the comparison of the voltage of the first potentiometer output signal to the voltage of the second potentiometer output signal; and
control the trailer brake output circuit based on whether the first potentiometer output signal and the second potentiometer output signal are determined to be valid.

16. The system of claim 15, wherein the machine readable instructions stored in the one or more memory modules cause the system to perform at least the following when executed by the one or more processors:
determine a composite potentiometer output signal based on the voltage of the first potentiometer output signal and the voltage of the second potentiometer output signal, wherein the duty cycle of the pulse-width modulated trailer brake output command signal is proportional to the composite potentiometer output signal when: (i) the voltage of the first potentiometer output signal is greater than the lower threshold voltage and less than the upper threshold voltage; and (ii) the first potentiometer output signal and the second potentiometer output signal are determined to be valid.

17. The system of claim 15, wherein the duty cycle of the pulse-width modulated trailer brake output command signal is a first constant when: (i) the voltage of the first potentiometer output signal is less than the lower threshold voltage; and (ii) the first potentiometer output signal and the second potentiometer output signal are determined to be valid.

18. The system of claim 15, wherein the duty cycle of the pulse-width modulated trailer brake output command signal is a second constant when: (i) the voltage of the first potentiometer output signal is greater than the upper threshold voltage; and (ii) the first potentiometer output signal and the second potentiometer output signal are determined to be valid.

19. The system of claim 15, wherein the duty cycle of the pulse-width modulated trailer brake output command signal remains unchanged when the first potentiometer output signal and the second potentiometer output signal are determined not to be valid.

* * * * *